(12) United States Patent
Bull et al.

(10) Patent No.: US 11,165,492 B2
(45) Date of Patent: Nov. 2, 2021

(54) TECHNIQUES FOR SPATIALIZING AUDIO RECEIVED IN RF TRANSMISSIONS AND A SYSTEM AND METHOD IMPLEMENTING SAME

(71) Applicant: Southwest Research Institute, San Antonio, TX (US)

(72) Inventors: Tyler Thomas Bull, San Antonio, TX (US); Albert J. Parvin, Jr., San Antonio, TX (US); Gregg C. Williams, San Antonio, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 0 days.

(21) Appl. No.: 16/751,751

(22) Filed: Jan. 24, 2020

(65) Prior Publication Data
US 2021/0234611 A1    Jul. 29, 2021

(51) Int. Cl.
*G01S 11/02* (2010.01)
*H04W 4/024* (2018.01)
(Continued)

(52) U.S. Cl.
CPC ............ *H04B 7/24* (2013.01); *G01S 11/02* (2013.01); *H04R 5/04* (2013.01)

(58) Field of Classification Search
CPC ... H04B 7/24; G01S 3/02; G01S 11/02; G01S 19/01; G01S 19/03; G01S 19/13;
(Continued)

(56) References Cited

U.S. PATENT DOCUMENTS

| | | | | |
|---|---|---|---|---|
| 8,094,834 B1 * | 1/2012 | Brungart | ................. | H04S 7/304 381/92 |
| 8,902,085 B1 * | 12/2014 | Ray | ......................... | F41H 11/02 340/961 |

(Continued)

FOREIGN PATENT DOCUMENTS

| | | | | |
|---|---|---|---|---|
| CN | 200966055 Y | * | 10/2007 | ............. G01S 19/53 |
| CN | 102565834 A | * | 7/2012 | |

OTHER PUBLICATIONS

International Search Report and Written Opinion from corresponding PCT Appln. No. PCT/US2021/014602, dated Aug. 16, 2021.

*Primary Examiner* — Blane J Jackson
(74) *Attorney, Agent, or Firm* — Grossman, Tucker, Perreault & Pfleger, PLLC

(57) ABSTRACT

The present disclosure is generally directed to an approach for spatializing audio from a received radio transmission to allow a radio operator to audibly perceive audio from the received radio transmission as if originating from a direction that corresponds to a physical location of the transmitting radio. On the receiving side, also referred to herein as a receive (RX) pipeline, a radio device configured consistent with the present disclosure includes utilizing an orientation tracker, and head related transform functions to generate a binaural representation of an incoming transmission such that audio associated with the same gets spatialized to sound as if coming from a direction corresponding to the transmitting radio. On the transmit side, also referred to herein as the transmit (TX) pipeline, includes utilizing a location sensor (e.g., a time of flight and/or GPS sensor) and encoding scheme such that radio transmissions include associated geographical location data.

18 Claims, 5 Drawing Sheets

(51) Int. Cl.
*H04B 7/24* (2006.01)
*H04R 5/04* (2006.01)

(58) Field of Classification Search
CPC ........... G01S 11/06; H04R 5/00; H04R 5/033; H04W 4/02; H04W 4/024; H04W 4/029
See application file for complete search history.

(56) References Cited

U.S. PATENT DOCUMENTS

| 10,972,855 | B2* | 4/2021 | Engle | H04W 4/30 |
|---|---|---|---|---|
| 2010/0321241 | A1* | 12/2010 | Janosky | G01S 5/04 |
| | | | | 342/444 |
| 2012/0295637 | A1* | 11/2012 | Hannuksela | G01S 3/8034 |
| | | | | 455/456.1 |
| 2013/0051560 | A1* | 2/2013 | Ray | H04S 3/002 |
| | | | | 381/2 |
| 2017/0076617 | A1* | 3/2017 | Schupp | G08G 5/0008 |
| 2019/0025416 | A1* | 1/2019 | Celinski | G01S 11/06 |
| 2020/0007988 | A1* | 1/2020 | Raj | H04R 3/12 |

\* cited by examiner

TECHNIQUES FOR SPATIALIZING AUDIO RECEIVED IN RF TRANSMISSIONS AND A SYSTEM AND METHOD IMPLEMENTING SAME

TECHNICAL FIELD

This specification relates to radio communication systems, and more particularly, to an approach that spatializes audio from received RF transmissions to allow a radio operator to audibly perceive the received audio as coming from a direction that corresponds to an origin of the received RF transmission.

BACKGROUND INFORMATION

Radio systems that support two-way communication, also referred to as network radio systems, allow for individuals to communicate over a wide geographic range using one or more radio frequencies to carry voice, data, and other payloads such as encrypted information.

Such radio systems provide an invaluable and mission-critical role in the context of battlefields (both land, sea, and space), search and rescue operations, public safety incidents (e.g., scenarios that necessitate a coordinate response between first-responder entities such as police, fire, and emergency medical services), and a wide-range of other scenarios that depend on reliable communication between radio operators.

Existing radio systems are effective for allowing multiple radio operators to communicate via one or more frequencies. In addition, recent adoption of radio standards such as the P25 standard, allows for highly flexible radio systems that secure transmission, e.g., via encryption, provide compression through vocoding, and allow for segmentation of radio networks into multiple logical talkgroups. However, even modern radio systems such as P25 systems utilize basic push-to-talk (PTT) functions that result in each radio transmitting and rendering audio essentially in the exact form it was captured.

BRIEF DESCRIPTION OF THE DRAWINGS

These and other features will be better understood by reading the following detailed description, taken together with the drawings wherein.

The drawings included herewith are for illustrating various examples of articles, methods, and apparatuses of the teaching of the present specification and are not intended to limit the scope of what is taught in any way.

DETAILED DESCRIPTION

Figure 1:
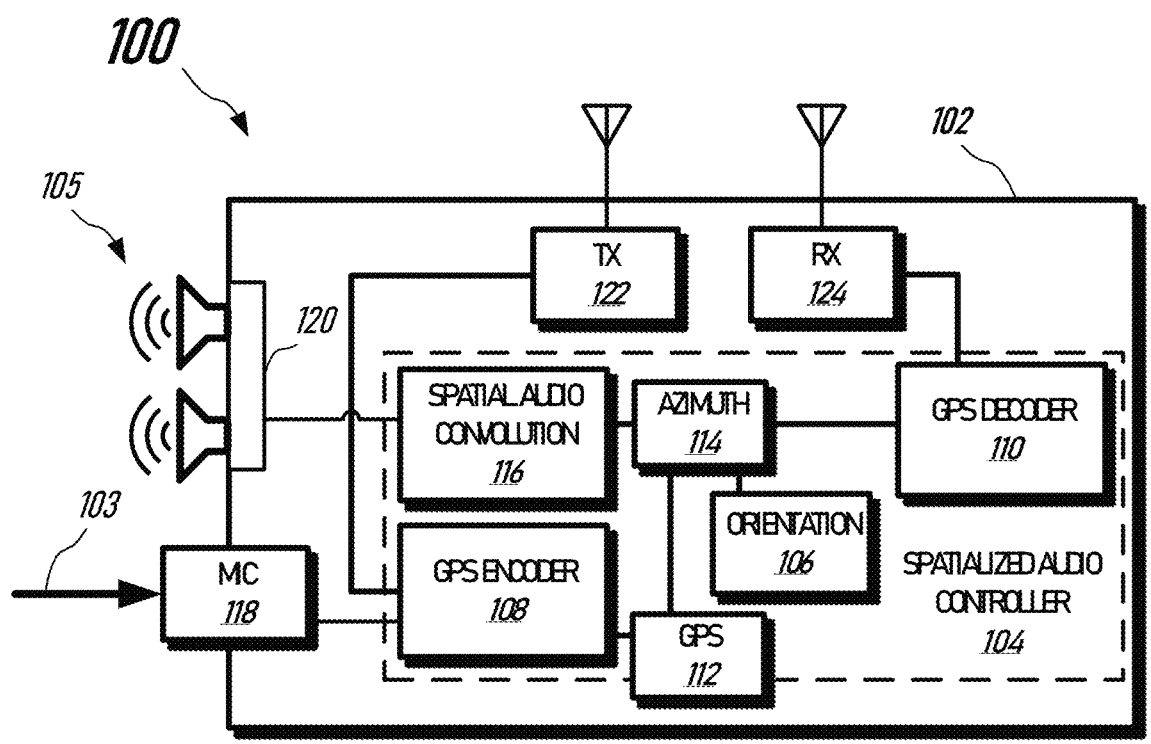
FIG. 1 shows a block diagram of an example spatialized audio system in accordance with embodiments of the present disclosure.

As discussed above, existing radio networks continue to operate on basic PTT principles that capture audio at a radio device, and then transmit and render the captured audio at one or more other radio devices. The rendered audio generally passes through transmit/receive pipelines that aim to preserve and playback captured audio with minimal artifacts (e.g., from vocoding) and noise introduction. The resulting playback experience allows for the radio operators of the receiving radio devices to hear radio communications, but information such as the position of the transmitting radio device cannot be identified via the rendered audio alone. In scenarios where multiple radios "key-up" at a similar instance in time, the rendered audio may be relatively jumbled and prevent or otherwise complicate a radio operator's ability to intelligibly discern each PTT.

The present disclosure is generally directed to an approach for spatializing audio from a received radio transmission to allow a radio operator to audibly perceive audio from the received radio transmission as if originating from a direction that corresponds to a physical location of the transmitting radio. On the receiving side, also referred to herein as a receive (RX) pipeline, a radio device configured consistent with the present disclosure includes utilizing an orientation tracker, e.g., such as a head tracker, and head related transform functions to generate a binaural representation of an incoming transmission such that audio associated with the same gets spatialized to sound as if coming from a direction corresponding to the transmitting radio. On the transmit side, also referred to herein as the transmit (TX) pipeline, a radio device configured consistent with the present disclosure includes utilizing a GPS sensor and encoding scheme such that radio transmissions include associated geographical location data.

Note, while the following examples and scenarios specifically discuss using GPS coordinates for location data, this disclosure is not limited in this regard. Alternatively, or in addition to GPS coordinates, other location tracking techniques and approaches can be utilized including radio triangulation, time-of-flight, vision systems, and satellite/drone imagery and vision systems. Moreover, while examples and features discussed herein include utilizing GPS sensors/chips local to a radio, the GPS information may be provided to a radio from a remote source such as an aforementioned drone/satellite vision system that can simultaneously track and differentiate between multiple targets. Accordingly, a radio may receive location data from a remote source and encode transmissions with that received location data. Alternatively, a system consistent with the present disclosure may transparently encode location data into RF transmissions. A communication network may therefore receive an RF transmission without location information (e.g., a conventional RF signal), and then inject/add the location data such that receiving radio devices can spatialize audio as discussed herein. Notably, in this scenario the transmitting radio may be a traditional radio that does not include circuitry and/or features directed to spatializing audio.

Still further, the present disclosure envisions a scenario where one or more radios attach to a communication network and do not include the necessary circuitry, software and/or resources to perform audio spatialization locally. Thus, one embodiment of the present disclosure includes spatializing audio at the system-level (or server-side). In this embodiment, a radio may therefore send an RF transmission without location data, e.g., a standard RF signal. The receiving system (e.g., a network switch and controller) may then receive the RF transmission and spatialize audio associated with the same based on, for instance, the known origin of the received RF transmission and the position of one or more receiving radios.

In a 1:1 scenario, whereby a first radio transmits only to a second radio, this can simply include the receiving system spatializing audio samples via RF signaling and sending the same to the second radio such that second radio can simply render the spatialized audio samples without additional processing. In a 1:N scenario, the receiving system (or network switch) can receive the RF transmission and 'split' the RF transmission via a workflow that generates multiple spatialized versions of the received RF transmission, e.g., in parallel. Each spatialized version may be associated with one or more radios, e.g., two or more radios with a similar location and similar heading may advantageously utilize the same spatialized audio. A plurality of RF transmissions may then be sent by the receiving system to ensure that each receiving radio receives spatialized audio that accounts for their position/orientation relative to the RF transmission origin.

Further, a hybrid may be implemented such that the receiving system selectively performs the aforementioned server-side generation of spatialized audio for standard radios configured without spatialization features as disclosed herein, while selectively not performing such server-side spatialization for those radios with spatialization features/capabilities as disclosed herein. The receiving system may differentiate between radios capable and not capable of spatialized audio based on, for instance, a registration message and/or lookup table that is populated with radio handset/system identifiers (IDs) and associated feature capabilities.

In any such cases, such server-side spatialization of audio can advantageously reduce the complexity of the circuitry/ software implemented by a radio to achieve spatialized audio features discussed herein, and also reduce computational load on a radio to extend operational battery life.

In one specific example embodiment, a spatialized audio controller is disclosed herein. The spatialized audio controller is implemented within a radio device and configured to receive an RF transmission from a remote radio device of the plurality of remote radio devices via the RF receiving circuit and generate spatialized audio samples based on the received RF transmission, wherein the generated spatialized audio samples include virtual placement of an origin of the RF transmission to cause the radio operator to audibly perceive a transmission direction from which the received RF transmission originated relative to a current heading of the radio operator.

Thus, radios configured to implement RX and TX pipelines as variously disclosed herein can advantageously encode and decode geographical data to ensure that audio gets spatialized and rendered in a form that allows for an associated radio operator to not only hear the captured audio but to also perceive the audio as originating from an appropriate direction.

Radio systems implementing spatialized audio features of the present disclosure also provide numerous additional features and advantages over existing radio network technologies. For example, search and rescue operations may be significantly aided by rescuers being able to locate each other, as well as locate victims after being located by a rescuer. Likewise, allies may be easily distinguished from potential threats by virtue of a radio operator being able to determine an ally's current locations. In addition, in instances of multiple transmissions occurring concurrently, a radio device implementing spatialized audio features of the present disclosure can allow for a radio operator to hear and perceive those concurrent communications as arriving from their respective different directions. Accordingly, intelligibility of transmissions and usability of radio devices in high-traffic scenarios, e.g., battle fields, search and rescue operations, and so on, is thus increased.

Radio devices consistent with the present disclosure can integrate the aforementioned TX and RX pipelines, e.g., hardwired via additional circuitry and/or firmware, although spatialized audio features of the present disclosure may be implemented in a modular backwards compatible manner that allows for existing radios to implement spatialized audio features of the present disclosure.

Turning to the Figures, FIG. 1 shows a block diagram of an example system 100 for spatializing audio within a radio communication network, also referred to herein as simply a communication network. As shown, the system 100 includes a plurality of components implemented within a housing 102 of a mobile radio device. Thus, the system 100 integrates seamlessly with radio devices, and preferably, mobile radio devices, without necessarily increasing footprint and "bulk" of the housing 102. Alternatively, an external housing/ enclosure implements components of the system 100 to allow for traditional/existing radio devices to implement spatialized audio features as disclosed herein. For instance, a peripheral device such as a headphone device can include components of the system 100 and circuitry to couple to a standard audio jack of a radio to provide spatialized audio features.

Continuing on, the system 100 preferably includes a spatialized audio controller 104, an audio capture device 118, audio output device 120, a transmit (TX) circuit 122 (or RF transmitter circuit 122) and a receive (RX) circuit 124 (or RF receiver circuit 124).

The spatialized audio controller 104 comprises an orientation sensor 106, a global positioning system (GPS) encoder 108, a GPS decoder 110, a GPS sensor 112, an azimuth calculator 114, and a spatial audio convolution transform 116. The components of the spatialized audio controller 104 manifest as software (e.g., machine-readable instructions compiled from C or C++ and executed on a processor/microcontroller), hardware (e.g., hardcoded gate level logic, discrete circuitry, and/or purpose-built silicon), or firmware (e.g., embedded routines executing on a microcontroller), or any combination thereof.

The spatialized audio controller 104 implements, in a general sense, two distinct but related pipelines for transmission and reception of radio frequency (RF) signals, which will be referred to herein as the RX pipeline and TX pipeline. Each pipeline will now be discussed in turn.

Figure 2:
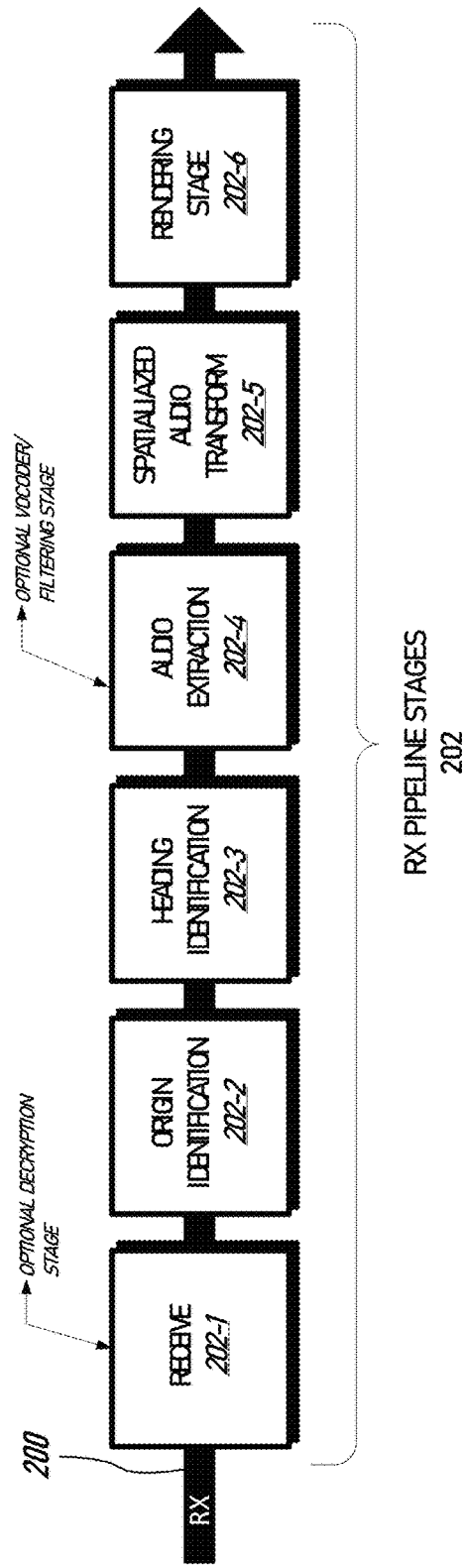
FIG. 2 shows an example receive pipeline suitable for implementation within the spatialized audio system of FIG. 1.

Turning to FIG. 2, with additional reference to FIG. 1, the RX pipeline 200 includes a plurality of stages shown collectively at 202 and individually as 202-1 to 202-6. As shown, the stages of the RX pipeline 200 begin with a receive stage 202-1 for receiving a transmitted RF signal (also referred to herein as an RF transmission) from a first mobile radio device, referred to herein as simply the transmitting radio for ease of description. Likewise, the radio operator associated with the radio device implementing the RX pipeline 200 is referred to below as a receiving radio operator.

In this stage, the spatialized audio controller 104 receives a radio transmission via the RX circuit 124. The received radio transmission comprises an RF signal with audio and/or data modulated thereon. The RF signal optionally includes a secured payload for voice and/or data signals, e.g., using one or more encryption schemes, although this disclosure is not limited in this regard. To this end, spatialized audio controller 104 optionally decrypts audio and/or data components/payloads of the received RF signal utilizing a key management component (not shown) and appropriate decryption algorithm.

The spatialized audio controller 104 then provides at least a portion of the received RF signal to an origin identification stage 202-2 to identify an origin/position for the received RF signal. In this stage, the spatialized audio controller 104 utilizes GPS decoder 110 to extract GPS coordinates, e.g., representative of latitude and longitude, from the received RF signal. The received RF signal includes the coordinates encoded in an in-band approach, e.g., transmitted within a primary frequency range that carries voice and data, and/or data, or out-of-band via secondary frequencies, for example.

In any such cases, encoding the GPS coordinates can include modulation at frequencies audible to the human ear, or in-audible, depending on a desired configuration. The origin identification stage 202-2 therefore includes extracting the GPS coordinates via GPS decoder 110, with the extracted GPS coordinates indicating a point of origin which is representative of the geographical location of the transmitting radio. As discussed in further detail below, the transmitting radio potentially changes physical location multiple times during a single radio transmission, e.g., based on traveling through an environment on foot or via vehicle.

Accordingly, the encoded GPS coordinates preferably represent one or more geographical locations of the radio operator during transmission of the received RF signal, which may also be referred to as originating geographical positions. The encoded GPS coordinates optionally include sync information to align with audio and/or data of the received RF signal, such as a timestamp values, and/or the spatialized audio controller 104 can infer/determine such sync information based on GPS coordinates interleaved within audio samples within the received RF signal, for example.

The spatialized audio controller 104 then outputs the extracted GPS coordinates to the heading identification stage 202-3 to identify a transmission heading. The transmission heading represents a direction of the transmitting radio operator relative to the receiving radio operator. The heading identification stage 202-3 includes an azimuth calculator coupled to an output of an orientation sensor 106. The orientation sensor 106 outputs one or more values representing a current heading of the receiving radio operator. For example, the orientation sensor 106 can include a magnetometer operating as a compass sensor configured to output a compass value, e.g., a cardinal direction so as north, east, south, and west. Alternatively, or in addition, the orientation sensor 106 can include a multi-axis gyroscope, a multi-axis (e.g., 3-axis) magnetometer, and/or accelerometer. In this example, the orientation sensor 106 may be wearably coupled to a radio operator via a head mount to provide a head tracking sensor.

As generally referred to herein, the term current heading generally refers to a compass direction associated with a radio operator. In the context of examples and scenarios discussed below, the current heading for a radio operator generally corresponds to a direction in which their nose is pointing (herein also referred to as a nose direction indicator or simply a nose direction). However, this disclosure is not limited in this regard, and a current heading may also correspond to a direction that extends perpendicular from a radio operators's chest/body. Likewise, the current heading can indicate the direction in which the nose/front of the vehicle is pointed towards in the context of a vehicle-based implementation.

Thus, more generally, the current heading may also generally correspond with a detected direction of interest for the radio operator. The orientation sensor 106 may therefore detect and output a value representing the direction of interest as the cardinal direction a user is facing/pointing, e.g., based on the aforementioned head tracking sensor and an integrated magnetometer.

In any such cases, the azimuth calculator 114 receives the output from the orientation sensor 106 to determine the current heading for the receiving radio operator. The azimuth calculator 114 then determines a transmission heading, which may also be referred to as a transmission azimuth, based on the current heading and the identified origin for the received RF signal extracted/identified via the origin identification stage 202-2 discussed above. The transmission heading may also be referred to as azimuth (a), wherein azimuth (a) represents a horizontal angle measured clockwise from a north base line or meridian. However, azimuth may also be defined more generally as a horizontal angle measured clockwise from any fixed reference plane or predefined base direction.

Determining the transmission azimuth may also further include identifying an associated elevation difference between the radio operators. For instance, a time of flight system collectively deployed between a plurality of operators, e.g., 4 or more, may be utilized to determine a relative elevation angle in addition to an azimuth angle.

Continuing on, the spatialized audio controller 104 then outputs the determined transmission heading from the azimuth calculator to the audio extraction phase 202-4 to extract a first portion of audio samples from the received RF signal. This phase can include optional processing a portion of the received RF signal through a vocoder and/or filtering components to extract and output a predetermined number of audio samples. The spatialized audio controller 104 calculates the predetermined number of audio samples dynamically, or based on a static value stored in a memory (not shown). Alternatively, the audio extraction phase 202-4 extracts all available audio samples of the received RF signal as the same are received over the air.

In any such cases, the spatialized audio controller 104 then outputs the transmission heading and extracted audio samples from the heading identification stage 202-3 and audio extraction stage 202-4, respectively, to the spatialized audio transform stage 202-5 to generate spatialized audio samples. In this stage, the spatialized audio controller 104 utilizes the spatial audio convolution transform 116 to generate spatialized audio samples, with the generated spatialized audio samples including virtual placement of an origin of the RF transmission to cause the radio operator to audibly perceive a transmission direction from which the received RF transmission originated relative to a current heading of the receiving radio operator. Stated differently, the generated spatialized audio samples are configured to cause the receiving radio operator to audibly perceive the extracted audio as originating from a direction corresponding to the transmission heading, which is to say the geographical location direction of the transmitting radio.

The spatial audio convolution transform 116 can utilize, for example, a head-related transfer function (HRTF) to generate spatialized audio, which may also be referred to as three-dimensional (3D) audio. The spatial audio convolution transform 116 therefore provides binaural integration to output audio samples that allow for a radio operator to perform sound localization to audibly perceive the physical location direction of sound sources, or more accurately, transmitting radios. Moreover, the spatial audio convolution transform 116 provides a binaural representation that allows for sound segregation, whereby a receiving radio operator can identify and distinguish between multiple concurrent sound sources.

Spatialized audio samples, as generally referred to herein, render sound waves in a manner that allows for a radio operator to simultaneously perform sound localization and/or sound segregation via, in a general sense, auditory trickery that virtually places sound sources in three-dimensional space around a listener based on their ears and auditory nerves. Such audio spatialization is achievable via as few as two speakers, although an array of 3 or more speaker devices can achieve higher degrees of resolution.

Continuing on, the spatial audio convolution transform 116 utilizes pre-trained data sets within the HRTF function, and/or from a synthetic head model such as the Knowles Electronics Mannequin for Acoustics Research (KEMAR) or other suitable dataset provider such as is offered by the Center for Image Processing and Integrated Computing University of California (CIPIC) database and Acoustics Research Institute (ARI). Densely-populated databases of HRTF provide high resolution spatial renderings and are preferable.

However, sparse datasets having HRTFs for every 5 to 15 degrees are also suitable for use and desirable in scenarios where power consumption is important. For instance, mobile radios tend to dedicate battery power to the primary function, e.g., the transmission and reception of RF signals. Accordingly, sparse HRTF can be utilized to achieve low-power modes of operation for the system 100. In the low-power mode, the spatialized audio controller 104 can utilize a sparse HRTF dataset and then implement an HRTF snap or HRTF interpolation routine. The spatialized audio controller 104 may switchably transition from a high-power mode (e.g., using high resolution HRTF data sets and supporting algorithms) to the low-power mode based on a user-configured setting and/or based on a battery charge value falling below a threshold value.

Continuing on, the spatialized audio controller 104 may then output the generated spatialized audio sample 105 to the rendering stage 202-6 to output the same via, for instance, audio output device 120. The generated spatialized audio samples 105 can include at least a left and right channel to provide stereo audio during rendering/output via left/right speakers of the audio output device 120. Preferably, the audio output device 120 includes a plurality of speaker devices arrayed about a radio operator to allow the user to audibly perceive audio as originating in virtually any direction, e.g., 360-degrees about the receiving radio operator. Alternatively, or in addition, the rendering stage 202-6 can include a visual indicator of the transmission heading. For example, an LED corresponding to a particular direction may be energized to visually indicate the transmission heading.

Figure 4:
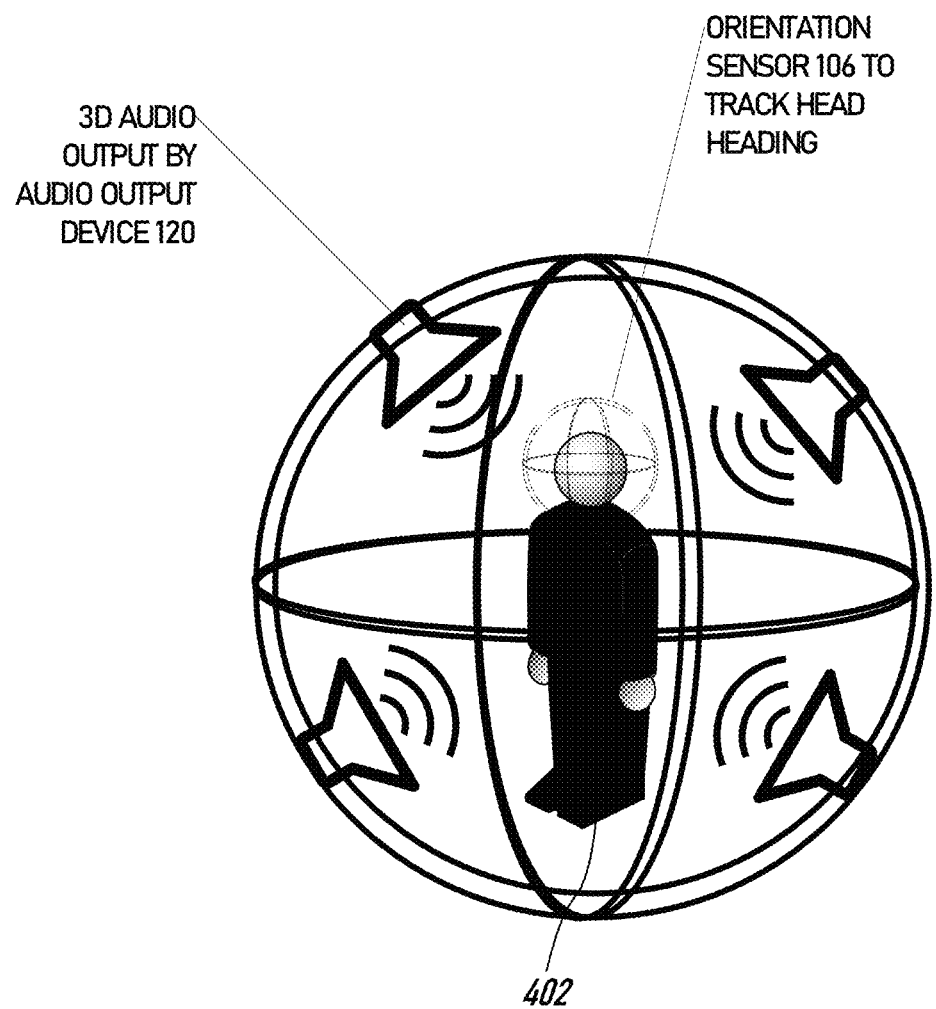
FIG. 4 illustrates an approach for spatializing audio for playback to a radio operator and head tracking of the same, in accordance with an embodiment of the present disclosure.

Turning briefly to FIG. 4, an embodiment shows a radio operator 402 listening to 3D audio generated by the system 100. As shown, the radio operator 402 audibly perceives audio as arriving from an identified transmission direction, as discussed above. The identified transmission direction corresponds with a virtual position for the transmitting device. Notably, the system 100 may be configured to mix multiple received RF signals such that a user can simultaneously hear two or more different transmissions, and importantly, audibly perceive the transmission direction corresponding to each, e.g., via audio segregation as discussed above. In addition, orientation sensor 106 implemented as a head tracking sensor wearably couples to the radio operator 402.

In operation, the output of the orientation sensor 106 allows for the spatialized audio samples generated during the spatialized audio transform stage 202-5 (see FIG. 2) to maintain position of the virtual location of the source based on head movements. For example, consider a scenario where the radio operator turns their head towards the general direction of a transmitting radio based on spatialized audio output from stage 202-5. In response to the head movement, the orientation sensor 106 can output a value indicating that the direction of interest for the radio operator 402 changed. The spatialized audio transform stage 202-5 may then receive the output from the orientation sensor 106 and adjust the binaural representation within the audio samples in a real-time fashion to maintain the virtual position of the source. Thus, when the radio operator turns their head and faces a transmission direction, e.g., adjusts their current heading to align with the Azimuth of the transmitting source, the radio operator can audibly perceive that that the transmitting device is immediately in front of them.

Notably, the transmitting radio may also change physical position mid-transmission, as previously discussed, and in this scenario the spatialized audio transform stage 202-5 can adjust dynamically based on receiving an updated transmission direction from the origin identification stage 202-2. Thus, the receiving radio operator may also audibly perceive that the transmitting radio is moving, and the direction of that movement, based on a corresponding virtual location within the spatialized audio samples being adjusted.

Figure 3:
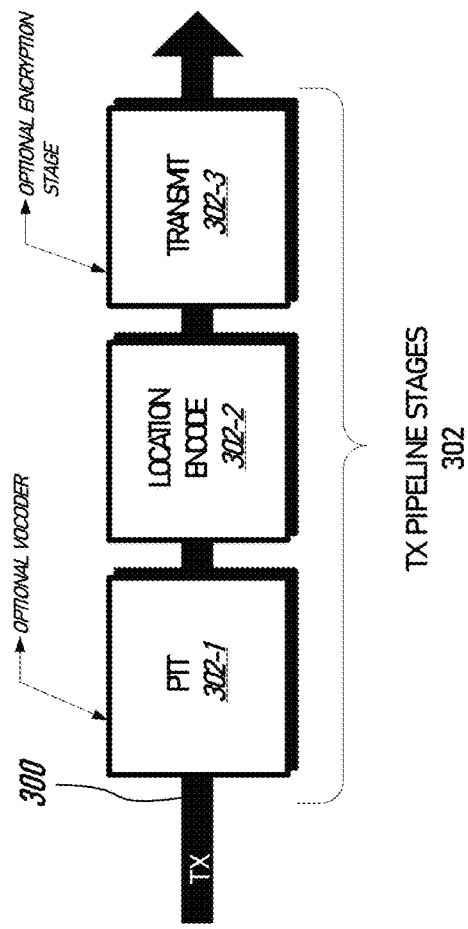
FIG. 3 shows an example transmit pipeline suitable for implementation within the spatialized audio system of FIG. 1.

Turning to FIG. 3, with additional reference to FIG. 1, the TX pipeline 300 includes a plurality of stages shown collectively as 302 and individually as 302-1 to 302-6. As shown, the stages of the TX pipeline 300 begins with a push-to-talk (PTT) stage 302-1. The transmitting radio operator may initiate the stage by depressing a PTT button of a radio device, for example.

However, the PTT stage 302-1 optionally gets triggered based on, for instance, a sensor of the radio device detecting the radio operator is incapacitated (See e.g., FIG. 6 and accompany description below). Further, the PTT stage 302-1 can be triggered in response to the spatialized audio controller 104 receiving an acknowledgement (ACK) request (or ACK signal) from a remote radio device (See e.g., FIGS. 6-7 and accompany description below). In this example, the spatialized audio controller 104 can receive the ACK request (which may also be referred to herein as a location request signal or simply a location request) and respond by initiating the PTT stage 302-1 to transmit an ACK response signal via TX circuit 122, with the ACK response including an optional audible tone. As discussed below, a radio operate may therefore broadcast an ACK request to one or more target mobile radios, and in response to receiving ACK response signals, the spatialized audio controller 104 can generate spatialized audio as discussed above to render audio in a manner that allows a receiving radio operator to audibly perceive the transmission direction of each ACK. Note, the ACK response signals may not necessarily include an accompanying audible tone, and in this scenario, the spatialized audio controller 104 can utilize a tone stored in a memory or simply synthesize a tone to generate spatialized audio samples therefrom.

In any event, the spatialized audio controller 104 may then capture input audio 103 via audio capture device 118 during the PTT stage 302-1, e.g., when a radio operator engages a PTT button or feature of the radio device. The audio capture device 118 can be implemented as a mems-type microphone or any other sensor capable of converting sound waves into a proportional electrical signal. The PTT stage 302-1 then outputs audio samples based on the captured audio, e.g., as digital or analog signals. The PTT stage 302-1 may also utilize an optional vocoder stage to compress audio in a predetermined digital format, for example.

The spatialized audio controller 104 then outputs the captured audio samples from the PTT stage 302-1 to the location encode stage 302-2. In this stage, the spatialized audio controller 104 provides output of the GPS sensor 112 and the outputted captured audio samples to GPS encoder 108. In turn, GPS encoder 108 encodes GPS data within the captured audio, or alternatively, generates location data for encoding within a transmit RF signal also carries captured audio samples, e.g., in-band, or out-of-band as discussed above. As discussed above, the encoded location data generally corresponds with a physical location of the transmitting radio device. The location of the transmitting radio device changes over time, e.g., based on radio operator/vehicle movement, and the location encode stage 302-2 can update the encoded location in response to those detected location changes. Note, other types of location sensors may be utilized and the present disclosure is not limited to GPS sensors. For instance, time of flight sensors may be utilized in combination with, for instance, a triangulation scheme to determine location data/information.

The spatialized audio controller 104 then outputs the captured audio and encoded location data to the transmit stage 302-3. This stage includes the spatialized audio controller 104 transmitting the captured audio and encoded location data as an RF transmission via TX circuit 122.

Additional Methodologies and Architecture

Figure 5:
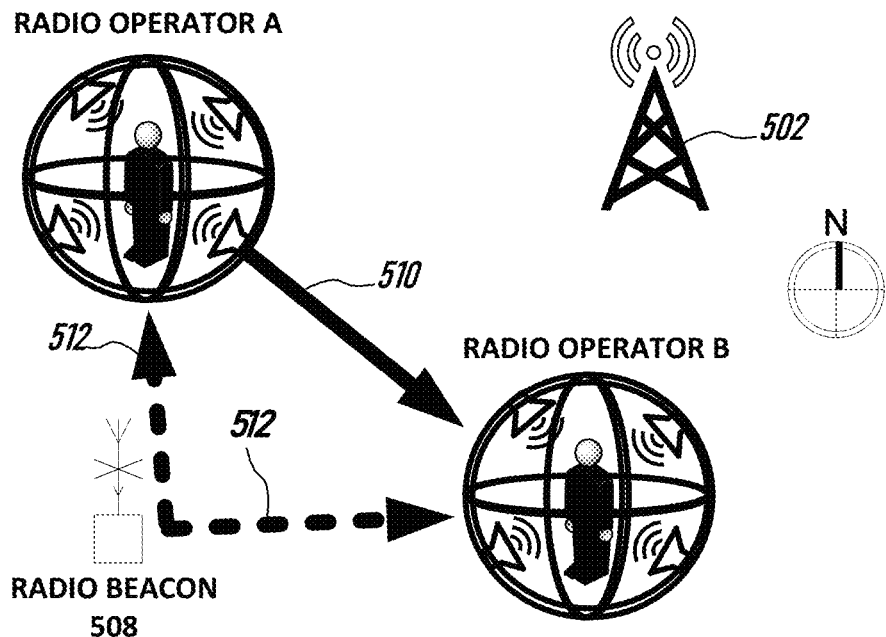
FIG. 5 illustrates an example approach for spatializing audio transmitted between a plurality of radio devices within a radio network, in accordance with embodiments of the present disclosure.

Some aspects and features of the present disclosure may be better understood by way of example. FIG. 5 illustrates one example of a Radio Operator A (or first radio operator) utilizing a mobile radio that implements spatialized audio features/components as variously disclosed herein to communicate with Radio Operator B (or second radio operator) who is also utilizing a mobile radio that also implements spatialized audio features/components disclosed herein. In this scenario, the Radio Operators A and B each have mobile radio devices of a plurality of remote mobile radio devices communicatively associated with a communications network 502 represented by a radio tower. In this scenario, each PTT and resulting RF transmission by Radio Operator A gets received by radio Operator B, and in response thereto, processed via RX pipeline 200 and spatialized as discussed above.

Accordingly, Radio Operator B audibly perceives the radio transmissions originating from Radio Operator A in a transmission direction/Azimuth generally indicated at 510. In particular, the Radio Operator B audibly perceives the transmissions of Radio Operator A as originating from just behind their right ear, which is to say from a virtual position which is north-east of their current heading.

As further shown in FIG. 5, one or more optional radio beacons 508 may be deployed and associated with the communications network 502. The one or more radio beacons 508 can include a TX pipeline as generally disclosed herein that allows for encoding of positional data within RF transmissions 512, which may also be referred to herein as beacon RF signals. Thus, Radio Operators A and B can receive the RF transmission 512, in response thereto, utilize the generated spatialized audio based on the same to audibly perceive a transmission direction of the one or more radio beacons 508. In this scenario, waypoints or other locations of interest may be "marked" (e.g., via an air drop or other deployment) and a beacon mode thereof activated to broadcast their respective positions to the radio operators. The beacon mode can include periodically broadcasting RF transmission 512, e.g., every 10 seconds or other chosen interval. Alternatively, the beacon mode may be selectively activated using, for example, an ACK request transmission from Radio Operators A or C.

Note that the radio beacons 508 may not necessarily be deployed as physical devices. For example, radio beacons 508 may be virtualized such that the communications network 502 sends RF transmission 512 to radio operators with associated location data as if transmitting from a specific/target geographic location. For instance, a user interface screen may be engaged by a user to select a position on a map. The GPS data for that location may then be sent via an RF transmission such that receiving radio operators can perceive the direction of origin as being the map location selected by the user. Thus, one or more virtual beacons may be deployed to allow for target/location "painting" without necessarily deploying a physical device at that location.

Continuing on, locations/positions of interest provided by the aforementioned beacons could mark enemy/threat positions, victim positions, and landmarks. Military personnel, search and rescue professionals, first-responders, and so on, may then utilize a radio equipped with spatial audio generation as disclosed herein to navigate towards a target location (or away from a location, as the case may be).

The above-discussed beacon features may also be initiated to allow for ad-hoc targeting and locating during operations (e.g., search and rescue, military operations, and so on). For instance, a user may selectively deploy virtual beacons (e.g., via a user interface on a smart phone or computer device) to ensure that on-the-ground radio operators can easily identify locations/positions of interest. Those positions may then be added, removed and/or updated in a real-time fashion (e.g., via a user interface) to adopt to and satisfy constantly evolving real-world scenarios.

One such example of a real-world scenario includes mobile targets of interest. Consider a scenario where a vehicle gets tracked via satellite/drone imagery. Users, such as mission operators, may selectively enable tracking of the vehicle via the aforementioned virtual beacon, which may also be referred to as painting a target. In this scenario a controller/system may then track the vehicle position and translate the same to GPS coordinates. The GPS coordinates of the vehicle may then be sent by the communications network 502 via RF transmissions to allow for radio operators to identify the position of the tracked vehicle relative to their own heading/orientation, as well as the movement pattern/direction for the tracked vehicle. To this end, a stream of GPS coordinates may get sent in a periodic and/or continuous fashion to provide such updates. While the above example specifically references a vehicle, virtually any mobile target/entity such as personnel, planes, boats, and animals could be "painted" and tracked as discussed above.

Figure 6:
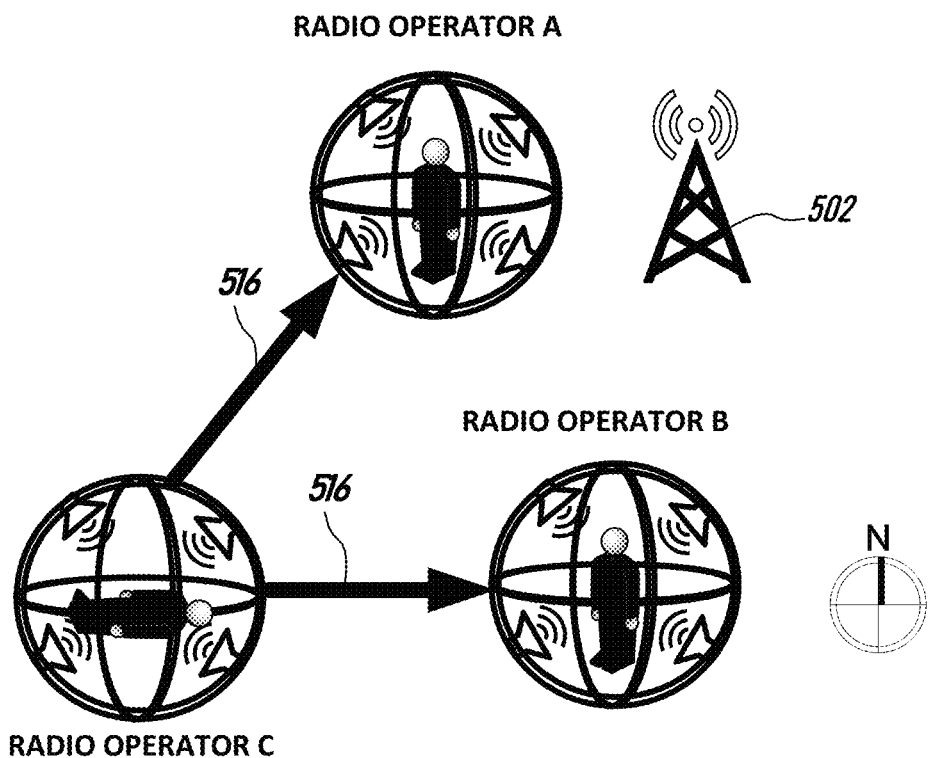
FIG. 6 illustrates an example approach for utilizing acknowledgement request transmissions and spatializing audio based on responses to the same during search and rescue scenarios, in accordance with an embodiment of the present disclosure.

FIG. 6 shows another example scenario of utilizing radios configured with spatialized audio features as variously disclosed herein to allow radio operators to understand the relative position of other radio operators. As shown, Radio Operator A and B can initiate an ACK request transmission to Radio Operator C as discussed above. In response, the radio device of Radio Operator C transmits ACK response transmissions 516 to Radio Operators A and B. In response, Radio Operators A and B audibly perceive the transmission direction of Radio Operator C. This may be particularly advantageous for situations, such as in combat or victim rescue scenarios, where other radio operators seek to locate Radio Operator C. Notably, Radio Operator C may include one or more sensors that cause the spatialized audio controller 104 to automatically broadcast RF transmissions 516 based on detecting a user being horizontal or otherwise incapacitated, for example.

Figure 7:
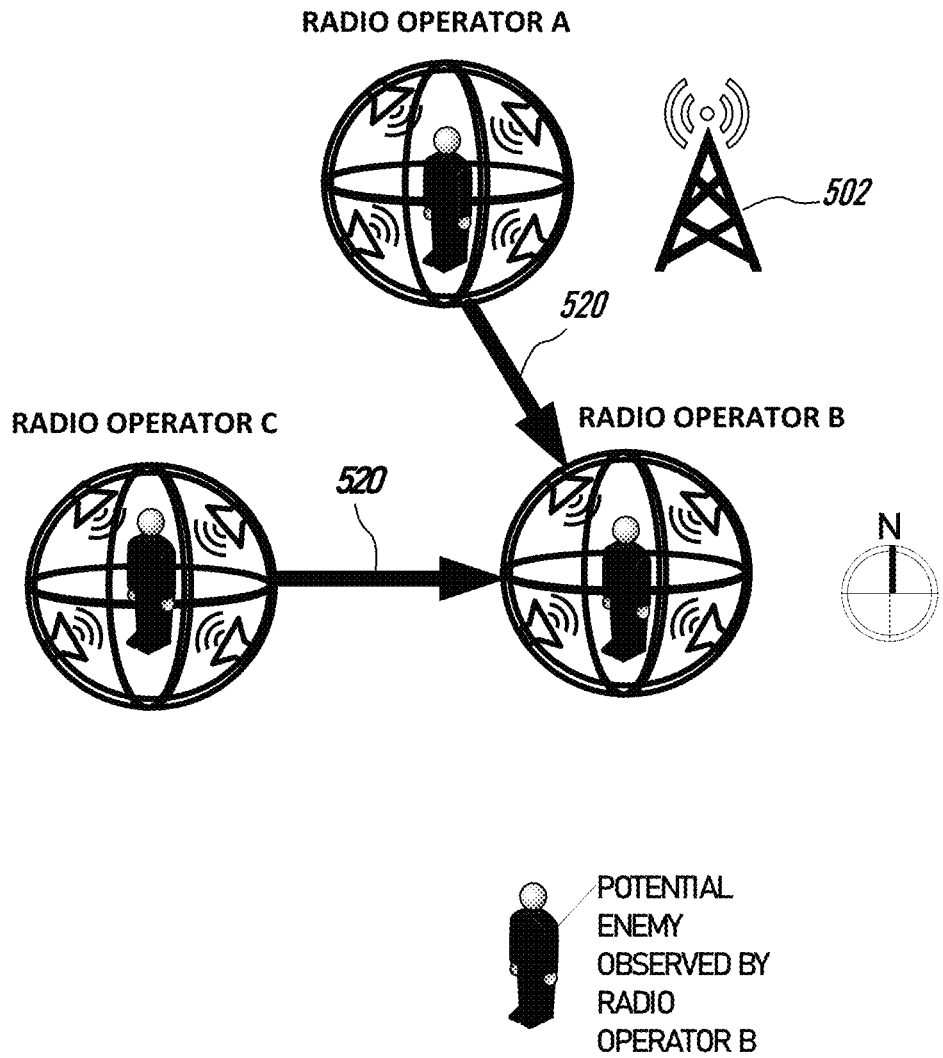
FIG. 7 illustrates another example approach for utilizing acknowledgement request transmissions and spatializing audio based on responses to the same in enemy/threat identification scenarios, in accordance with an embodiment of the present disclosure.

FIG. 7 shows another example scenario of utilizing radios having spatialized audio features as variously disclosed herein to allow radio operators to understand the relative position of other radio operators. As shown, radio operator B can broadcast a response request transmission to all, or a subset of radio devices associated with communications network 502. In response, each receiving radio device transmits an ACK response message 520. The Radio Operator B then receives each ACK response message 520, and in response thereto, can audibly perceive the transmission location/direction of each of Radio Operator A and C based on the generated spatialized audio. The Radio Operator B may then intuitively understand the relative position of each of Radio Operators A and C. In the context of a battlefield, the received ACK response messages further allow for Radio Operator B to easily identify the position of friends/allies in order to distinguish the same from potential enemies/threats.

In accordance with an aspect of the present disclosure a radio device for communicating with a plurality of remote radio devices within a communication network is disclosed. The radio device comprising a radio frequency (RF) receiving circuit, a spatialized audio controller to receive an RF transmission from a remote radio device of the plurality of remote radio devices via the RF receiving circuit and generate spatialized audio samples based on the received RF transmission, wherein the generated spatialized audio samples include virtual placement of an origin of the RF transmission to cause an associated radio operator to audibly perceive a transmission direction from which the received RF transmission originated relative to a current heading of the radio operator.

In accordance with another aspect of the present disclosure a system for spatializing audio within a communications network having a plurality of mobile radio devices that communicate with each other via radio frequency (RF) signaling is disclosed. The system comprising an orientation sensor coupled to a first radio operator, the orientation sensor to output at least a heading indicator representative of a direction of interest for the first radio operator, a location sensor to output a geographic location of the first radio operator, a spatialized audio controller communicatively coupled to the orientation sensor and the location sensor, the spatialized audio controller to receive a radio signal transmitted from a first mobile radio device of the plurality of mobile radio devices, identify a point of origin for the received radio signal transmitted by the first mobile radio device, the point of origin representative of the geographical location of the first mobile radio device, identify a transmission heading based at least on the heading indicator output by the orientation sensor and the identified point of origin for the received radio signal, extract a first portion of audio samples from the received radio signal, and generate a spatialized output audio signal based on the extracted first portion of audio samples and the identified point of origin for the received radio signal, the generated spatialized audio signal to cause the first radio operator to audibly perceive the received radio signal as originating from a location corresponding to the geographical location of the first mobile radio device.

In accordance with another aspect of the present disclosure a method for spatializing audio within a communications network having a plurality of mobile radio devices that communicate with each other via radio frequency (RF) signaling, the method comprising receiving, by a first radio device, a radio signal transmitted from a second mobile radio device of the plurality of mobile, identifying, by the first radio device, a point of origin for the received radio signal transmitted by the first mobile radio device, the point of origin representative of the geographical location of the second mobile radio device, identifying, by the first radio device, a transmission heading based at least on the heading indicator output by an orientation sensor and the identified point of origin for the received radio signal, extracting, by the first radio device, a first portion of audio samples from the received radio signal, and generating, by the first radio device, a spatialized output audio signal based on the extracted first portion of audio samples and the identified point of origin for the received radio signal, the generated spatialized audio signal to cause a radio operator associated with the first radio device to audibly perceive the received radio signal as originating from a location corresponding to the geographical location of the second mobile radio device.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. It will be appreciated by a person skilled in the art that a surface cleaning apparatus may embody any one or more of the features contained herein and that the features may be used in any particular combination or sub-combination. Modifications and substitutions by one of ordinary skill in the art are considered to be within the scope of the present disclosure, which is not to be limited except by the claims.

What is claimed is:

1. A radio device for communicating with a plurality of remote radio devices within a communication network, the radio device comprising:
a radio frequency (RF) receiving circuit;
a spatialized audio controller to receive an RF transmission from a remote radio device of the plurality of remote radio devices via the RF receiving circuit, the received RF transmission including audio samples captured by the remote radio device and an originating geographical position of the remote radio device, and generate spatialized audio samples based on the received RF transmission, wherein the generated spatialized audio samples include virtual placement of an origin of the RF transmission to cause an associated radio operator to audibly perceive a transmission direction from which the received RF transmission originated relative to a current heading of the radio operator; and a RF transmitter circuit, and wherein the spatialized audio controller is further configured to:

send a location request signal via the RF transmitter circuit, the location request signal to cause a radio device of the plurality of remote radio devices to activate a beacon mode and broadcast a beacon RF signal at a predetermined interval; and generate spatialized audio samples in response to receiving the beacon RF signal sent by the radio device with the activated beacon mode, the generated spatialized audio samples including virtual placement of an origin of each received beacon RF signal.

2. The radio device of claim 1, further comprising an orientation sensor to output a value representing a detected direction of interest for the radio operator, the current heading of the radio operator being based on the detected direction of interest.

3. The radio device of claim 2, wherein the orientation sensor is wearably coupled to the radio operator such that the detected direction of interest corresponds with a cardinal direction the radio operator is facing.

4. The radio device of claim 2, wherein the orientation sensor is implemented as a head tracking sensor with an integrated magnetometer, and wherein the detected direction of interest is based in part on output from the integrated magnetometer.

5. The radio device of claim 1, further comprising a global positioning system (GPS) sensor to output a geographical location of the radio device, and wherein the spatialized audio controller is further configured to generate the spatialized audio samples based on the outputted geographical location of the radio device and the originating geographical position associated with the received RF transmission.

6. The radio device of claim 1, wherein the originating geographical position is encoded at audible or inaudible frequencies within audio samples of the received RF transmission.

7. The radio device of claim 1, wherein the originating geographical position is encoded in an out-of-band signal at a different frequency from that of a frequency of the received RF transmission.

8. The radio device of claim 1, wherein the originating geographical position is encrypted and received by the radio device as a secured payload, and wherein the spatialized audio controller extracts the originating geographical position by decrypting the secured payload.

9. The radio device of claim 1, wherein the spatialized audio controller generates the spatialized audio samples based at least in part on a head-related transfer function (HRTF).

10. A system for spatializing audio within a communications network having a plurality of mobile radio devices that communicate with each other via radio frequency (RF) signaling, the system comprising:

an orientation sensor coupled to a first radio operator, the orientation sensor to output at least a heading indicator representative of a direction of interest for the first radio operator;

a location sensor to output a geographic location of the first radio operator;

a spatialized audio controller communicatively coupled to the orientation sensor and the location sensor, the spatialized audio controller to:

receive a radio signal transmitted from a first mobile radio device of the plurality of mobile radio devices;

identify a point of origin for the received radio signal transmitted by the first mobile radio device, the point of origin representative of the geographical location of the first mobile radio device;

identify a transmission heading based at least on the heading indicator output by the orientation sensor and the identified point of origin for the received radio signal;

extract a first portion of audio samples from the received radio signal; and generate a spatialized output audio signal based on the extracted first portion of audio samples and the identified point of origin for the received radio signal, the generated spatialized audio signal to cause the first radio operator to audibly perceive the received radio signal as originating from a location corresponding to the geographical location of the first mobile radio device;

cause a location request signal to be sent to a radio device of the plurality of mobile radio devices, the location request signal to cause the radio device to activate a beacon mode and broadcast a beacon RF signal at a predetermined interval; and generate spatialized audio samples in response to receiving the beacon RF signal from the radio device with the activated beacon mode, the generated spatialized audio samples including virtual placement of an origin of each received beacon RF signal.

11. The system of claim 10, further comprising at least first and second speaker devices implemented within headphones to render the generated spatialized audio output in stereo.

12. The system of claim 10, wherein the spatialized audio controller is further configured to identify the point of origin for the received radio signal transmitted based at least in part on extracting location data from the received radio signal.

13. The system of claim 10, wherein the spatialized audio controller is further configured to extract the first portion of audio samples from the received radio signal by decrypting a portion of the received radio signal.

14. The system of claim 10, wherein the orientation sensor further comprises a magnetometer configured to wearably couple to a user via a head mount and output a current nose direction indicator, and wherein the orientation sensor outputs the heading indicator based on the outputted nose direction indicator of the magnetometer.

15. The system of claim 10, wherein the spatialized audio controller is further configured to cause transmission of an acknowledgement (ACK) request signal, the ACK request to cause at least a second radio device of the plurality of radio devices to respond with a ACK response signal, and in response to the spatialized audio controller receiving the ACK response signal, generating spatialized audio samples configured to allow the first radio operator to audibly perceive a location of the second radio device relative to a current heading of the first radio operator.

16. A method for spatializing audio within a communications network having a plurality of mobile radio devices that communicate with each other via radio frequency (RF) signaling, the method comprising:

receiving, by a first radio device, a radio signal transmitted from a second mobile radio device of the plurality of mobile;

identifying, by the first radio device, a point of origin for the received radio signal transmitted by the first mobile radio device, the point of origin representative of a geographical location of the second mobile radio device;

identifying, by the first radio device, a transmission heading based at least on a heading indicator output by an orientation sensor and the identified point of origin for the received radio signal;

extracting, by the first radio device, a first portion of audio samples from the received radio signal;

generating, by the first radio device, a spatialized output audio signal based on the extracted first portion of audio samples and the identified point of origin for the received radio signal, the generated spatialized audio signal to cause a radio operator associated with the first radio device to audibly perceive the received radio signal as originating from a location corresponding to the geographical location of the second mobile radio device;

deploying a third radio device at a predefined location within a field of operation;

activating a beacon mode of the third radio device such that the third radio device periodically transmits a beacon RF signal; and receiving, by the first radio device, the transmitted beacon RF signal and generating spatialized audio to allow for a radio operator associated with the first radio device to audibly perceive a physical position of the third radio device.

17. The method of claim 16, wherein activating a beacon mode of the third radio device further comprises activating a virtual beacon within a radio system such that a user-selected position gets encoded into the beacon RF signal.

18. The method of claim 17, wherein activating a beacon mode of a third radio device further includes visualizing a map via a user interface, the user-selected position being based on the visualized map.

* * * * *